Jan. 24, 1967 C. L. HAWLEY, JR 3,300,758

HIGH SPEED SCANNER AND RESERVATION SYSTEM

Filed June 4, 1963 4 Sheets-Sheet 1

INVENTOR
CHARLES L. HAWLEY, JR.

BY
Cushman, Darby & Cushman
ATTORNEYS

HIGH SPEED SCANNER AND RESERVATION SYSTEM

Filed June 4, 1963

INVENTOR
CHARLES L. HAWLEY, JR.

BY Cushman, Darby & Cushman
ATTORNEYS

HIGH SPEED SCANNER AND RESERVATION SYSTEM

Filed June 4, 1963 4 Sheets-Sheet 3

INVENTOR
CHARLES L. HAWLEY, JR.

BY Cushman, Darby & Cushman
ATTORNEYS

Jan. 24, 1967 C. L. HAWLEY, JR 3,300,758

HIGH SPEED SCANNER AND RESERVATION SYSTEM

Filed June 4, 1963 4 Sheets-Sheet 4

INVENTOR
CHARLES L. HAWLEY, JR.

BY
Cushman, Darby & Cushman
ATTORNEYS 3,300,758

HIGH SPEED SCANNER AND RESERVATION SYSTEM

Charles L. Hawley, Jr., White Bear Lake, Minn., assignor to Control Data Corporation, Minneapolis, Minn., a corporation of Minnesota Filed June 4, 1963, Ser. No. 285,469
5 Claims. (Cl. 340—147)

This invention relates to a high speed scanner and reservation system and more particularly to an arrangement for providing selective communication between a storage module and one of a plurality of separate remote stations.

In the past, equipment designed for selectively interconnecting one of a number of remote stations with a central storage module has encountered a number of problems involved in determining message priority and preventing the equipment from operating when the storage module is busy communicating with another selected remote station. Additional difficulties encountered in known devices include undesirable consecutive honoring of the previously busy access channel when information is available for transmission on another channel which has been waiting for transmission on the busy channel to terminate.

This invention permits selection of one of a plurality of remote stations to communicate with a storage module on a "first come-first served" basis over an associated access channel on which transmission requests arrive without interference from requests arriving on other access channels.

Another object is to provide an arrangement whereby a channel requesting communication with the storage module is required to wait until transmission on a busy channel is completed at which time the waiting channel will be honored.

A further object is to provide priority circuits preventing a channel from being honored twice consecutively if a request is present on another channel.

A still further object is to insure that when a plurality of channels are waiting to be honored, each channel will be honored in turn.

Further objects and the entire scope of the invention will become more fully apparent when considered in light of the following detailed description of an illustrative embodiment of this invention and from the appended claims.

The illustrative embodiment may best be understood by reference to the accompanying drawings wherein:

FIGURE 4 is a schematic diagram of the priority circuit illustrated in FIGURE 2.

Briefly, the invention comprises a plurality of separate remote stations which are selectively connected to a storage module over associated access channels under the control of access channel selection and priority circuits individually associated with each of the channels. An individual access channel selection and priority circuit determines the presence of a request signal to disable the access channel selection and priority circuits of the remaining channels while simultaneously enabling the transmission channel between the storage module and one of the remote stations. The priority and scanner arrangement further provides for controlling the sequence of requests from other waiting channels while one channel is busy such that on termination of the transmission in the busy channel, the channel next in turn will be enabled. This is accomplished by an interconnection of priority circuits and a scanner which resolves conflicts of requests.

Figure 1:
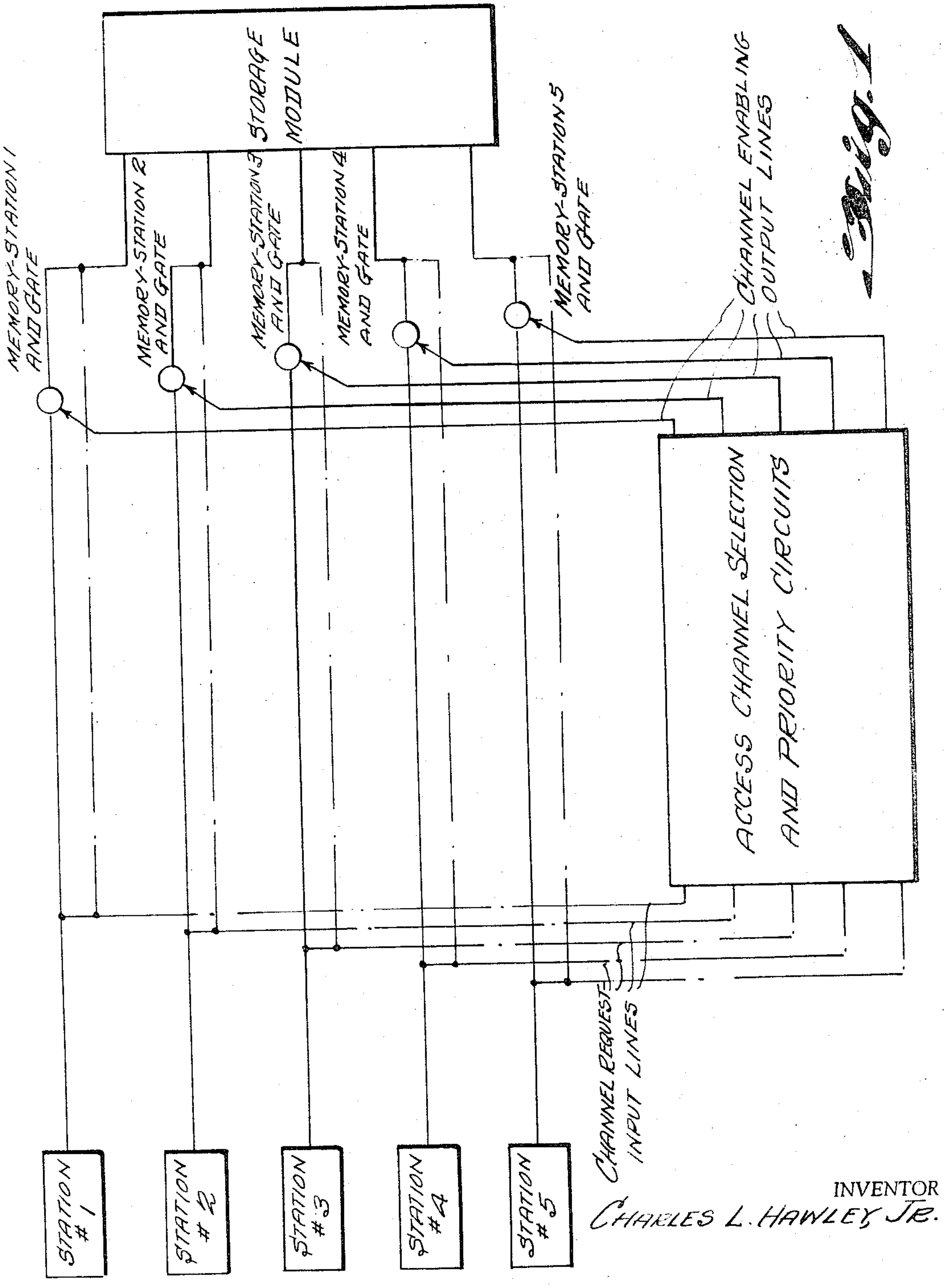
FIGURE 1 is a block diagram illustrating an entire communication system incorporating the high speed scanner and reservation system of the invention.

Referring to the block diagram of FIGURE 1, the over-all system, of which the invention forms a principal part, may be described. In this drawing, there is illustrated a plurality of remote stations 1 through 5 each of which is connected by an access channel through a Memory-Station AND gate to a storage module. To each one of the access channels on opposite sides of its respective Memory-Station AND gate there is provided a channel request input line connecting the channel to an associated access channel selection and priority circuit, these being shown collectively within one block. The output from each of the access channel selection and priority circuits is connected respectively to its associated Memory-Station AND gate over a channel enabling output line. For purposes of illustration, five remote stations are shown and the block diagram has been arranged to show the channel request input lines being positioned on opposite sides of the Memory-Station AND gates to indicate that transmission may be directed towards or away from the storage module upon enabling of the Memory-Station AND gate of the selected channel.

Figure 2:
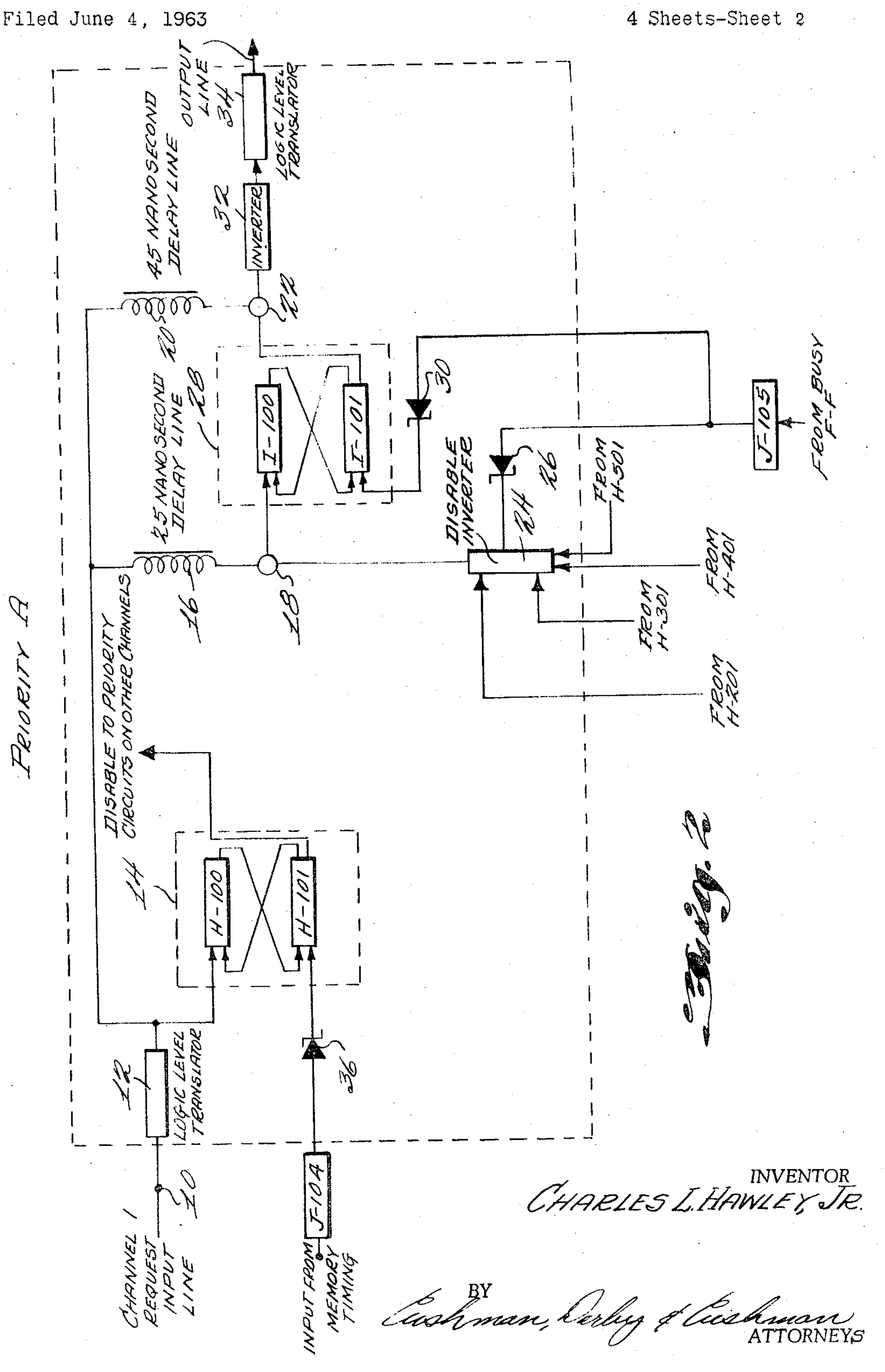
FIGURE 2 is a block diagram of a priority circuit utilized in determining priority of requests in the system illustrated in FIGURE 1.

An important element of the high speed scanner and reservation system which constitutes this invention is the Priority A circuit. This circuit is illustrated in FIGURE 2. For purposes of illustration, the Priority A circuit associated with channel 1 is shown. The channel 1 request input line is connected to an input terminal 10 which is joined with a Logic Level Translator 12. For purposes of illustration, the external transmission levels between the stations and the storage module are —1.1 volts for a logical "0" and a —5.8 volts for a logical "1." The Logic Level Translator 12 converts a —5.8 volt "1" to the internal logic level for a logical "1" as utilized by the priority circuit. This level is +1.7 volts. Similarly, a —1.1 volt "0" is translated to a +0.7 volt logical "0" used by the priority circuit. The output of the Logic Level Translator is connected to the SET input line of a bistable multivibrator, or flip-flop, 14 which includes a pair of inverters H–100 and H–101 having cross-coupled feedback paths. The output of inverter H–101 serves as the SET output line of flip-flop 14 and is directed to Priority A circuits of other channels to disable them when flip-flop 14 is SET. The output of Logic Level Translator 12 is also connected through a delay line 16 to one input terminal of an AND gate 18 and through a second delay line 20 to the input terminal of an additional AND gate 22. To the second input of AND gate 18 is connected the output line of a Disable Inverter 24. Inputs to the Disable Inverter include the outputs from the remaining Priority A circuits in the system corresponding to the SET output line of flip-flop 14. Also connected to the input of Disable Inverter 24 is the output of a zener diode 26 having an anode connected to the output of an inverter J–105 which is supplied from a BUSY flip-flop to be described in detail hereinafter. The output of AND gate 18 is connected to the SET input line of a second flip-flop 28 comprising inverters I–100 and I–101 having cross-coupled feedback paths. The SET output line of flip-flop 28, the output of inverter I–101, is connected as the second input to AND gate 22. Connected to the CLEAR input line of flip-flop 28 through a zener diode 30 is the output of inverter J–105. The output of AND gate 22 is connected through inverter 32 to a Logic Level Translator 34 which reconverts its input signals to the external logic levels of the system as previously set forth. To the CLEAR input line of flip-flop 14 is connected an input from memory timing which is inverted by J–104 and joined through a zener diode 36 to inverter H–101 of the flip-flop. Zener diodes 26, 30 and 36 function as both logic level translators and inverters, these diodes being 6.2 volt zener diodes. Therefore, a —5.8 volt "1" input to any of these diodes becomes a +0.4 volt output, and a —1.1 volt "0" input becomes a +5.1 volt output. These outputs act as logical "0's" and "1's" respectively in the Priority A circuit logic.

The function of the Priority A circuit of each channel is to permit honoring of its channel on a "first come-first served" basis without interference from any other access channel. The Priority A circuits are interconnected with the Priority A logic of each of the remaining access channels so that when one of them receives a logical "1" input, it disables the Priority A circuits in the remaining four channels. Thus, a request on any of the remaining channels is not honored until the first channel is no longer busy. Considering the case when no requests have been received, flip-flops 14 and 28 of each Priority A circuit are CLEARED thereby producing a "0" output from AND gate 22 which is inverted and reconverted by inverter 32 and Logic Level Translator 34 to the external logic of the system as a logical "1." It can be seen, therefore, that the Priority A circuit serves as an inverter. In this quiescent state with no other channels BUSY, the input to inverter J–105 is a logical "0" since the BUSY flip-flop to be described hereinafter is CLEARED. Accordingly, the output of J–105 is translated and inverted by zener diodes 26 and 30 to apply logical "0's" to Disable Inverter 24 and inverter I–101 respectively. Since all of the inputs to Disable Inverter 24 are "0's," a logical "1" is applied to one input terminal of AND gate 18. On receipt of a —5.8 volt logical "1" on the channel 1 request input line, the Logic Level Translator 12 converts this to a +1.7 volt logical "1" to SET flip-flop 14 thereby disabling the remaining priority circuits in the other channels since their Disable Inverter outputs are now logical "0's." After a delay determined by line 16, which for purposes of illustration is 25 nanoseconds, AND gate 18 is conditioned to SET flip-flop 28 thereby applying a logical "1" to one terminal of AND gate 22. Delay line 20 is chosen as a 45 nanosecond delay line. Therefore, 20 nanoseconds after AND gate 18 is conditioned, AND gate 22 is also enabled to pass a logical "1" output to inverter 32. The "0" output from the inverter is translated to a —1.1 volt logical "0" output from the Priority A circuit. The "0" output of the Priority A circuit is applied to suitable circuitry to be hereinafter described to enable the Memory-Station AND gate of the selected channel and to SET the BUSY flip-flop thereby applying a logical "1" to inverter J–105. The inverted output from J–105 is directed through the zener diode 30 to provide a logical "1" for CLEARING flip-flop 28. Simultaneously, with the SETTING of the BUSY flip-flop, the storage module, or memory, timing cycle is initiated to apply a logical "1" to inverter J–104. This "1" is inverted by J–104 and then translated and inverted by a zener diode 36 to provide a logical "1" which CLEARS flip-flop 14. The output of J–105 is also translated and inverted by zener diode 26 and to drive the disable inverter 24 thereby producing a logical "0" which is applied to AND gate 18 to prevent possible resetting of flip-flop 28 by runt pulses. The CLEARING of flip-flop 14 removes the disable signal from the other Priority A circuits so that a request on another channel may be honored.

The delay of line 16 and 20 in the Priority A circuit are chosen to allow time for stabilization of flip-flops 14 and 28 respectively.

Figure 3:
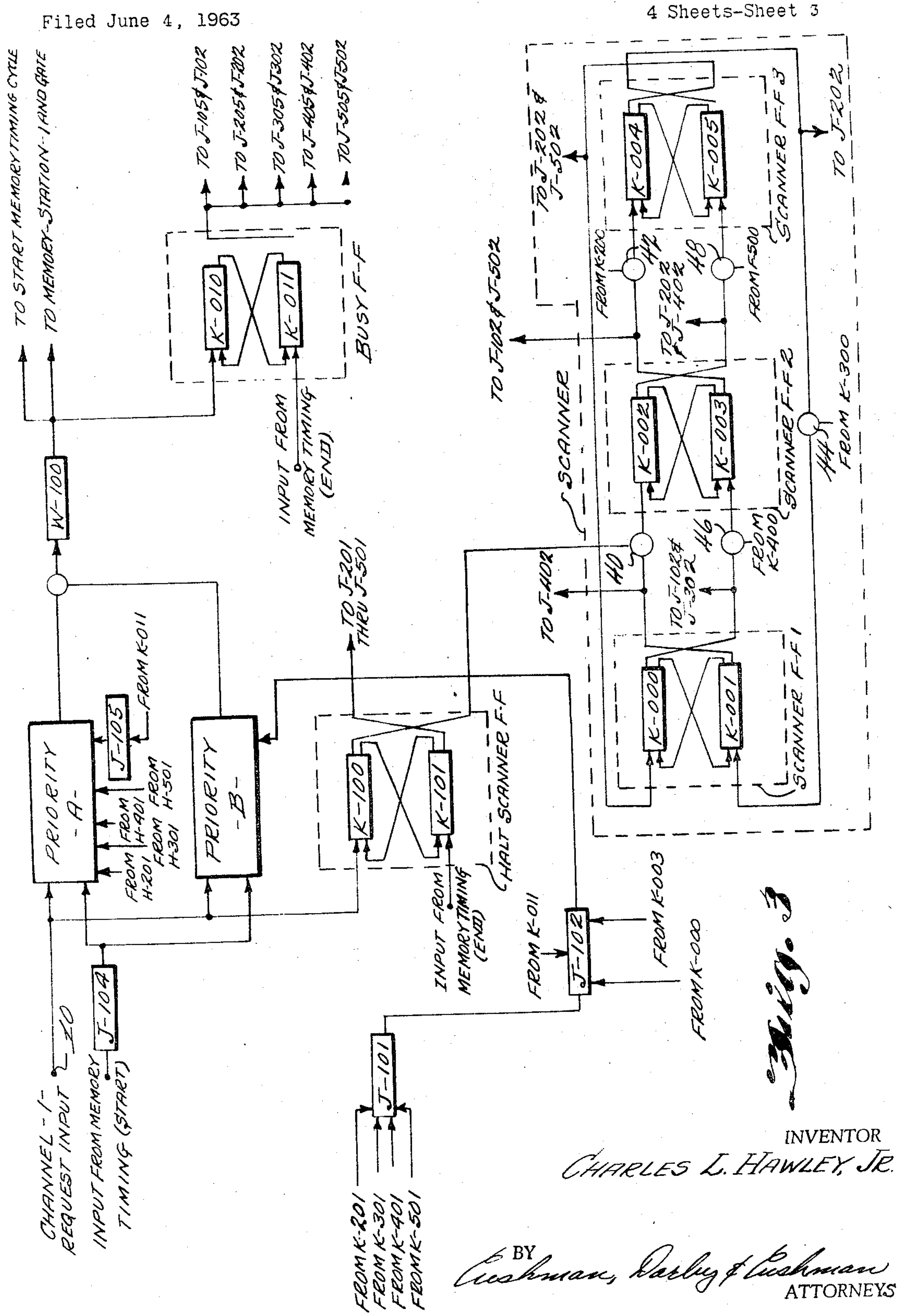
FIGURE 3 is a block diagram illustrating one of the access channel selection circuits including priority and scanner arrangements.
Figure 2:
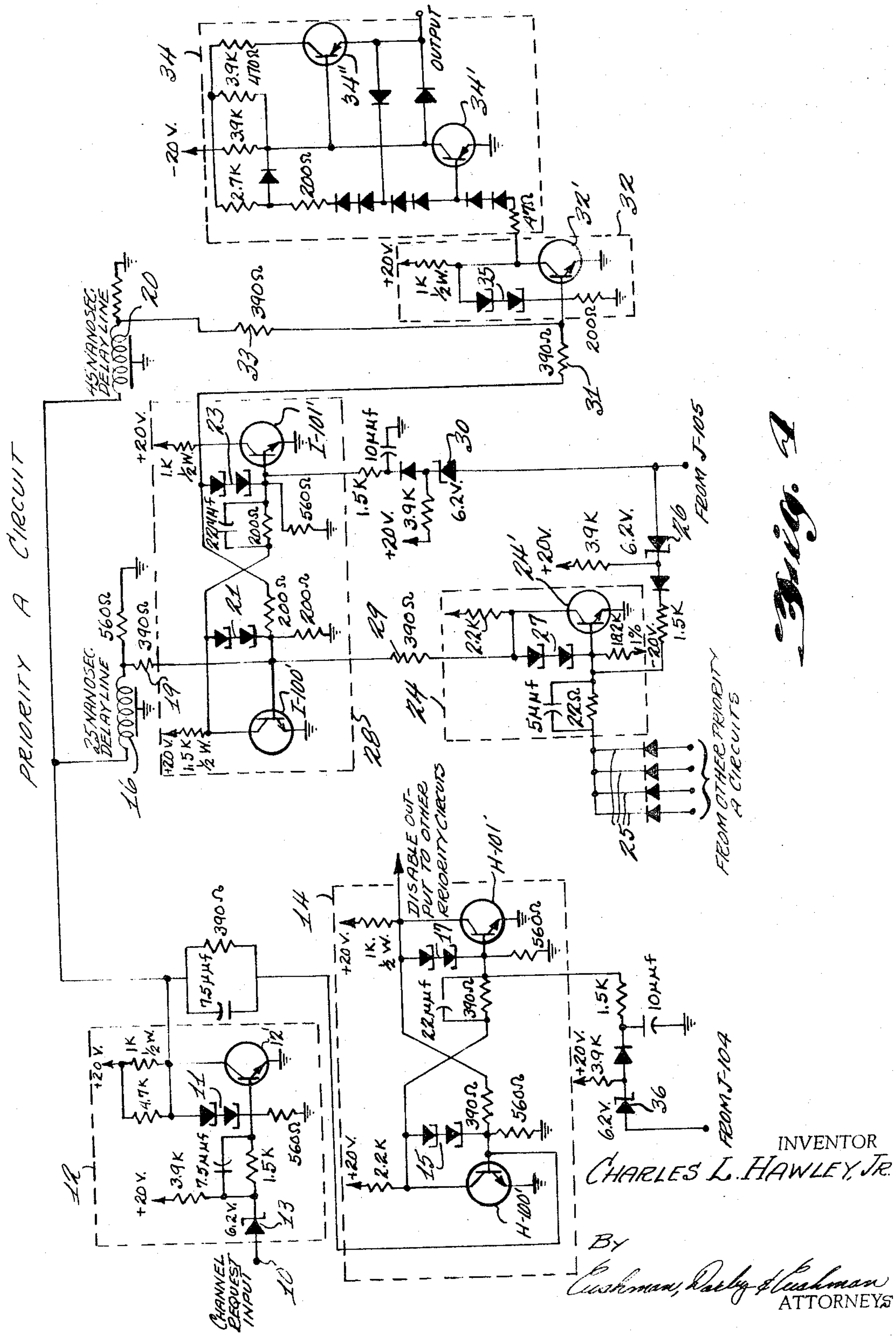

Referring to FIGURE 3, the high speed scanner and reservation system, which includes the priority arrangement just described, will now be set forth. The system is shown for one of the five channels, the access channel selection arrangement, or reservation system, of each of the channels being connected to a common Scanner. The channel 1 request input line is connected to the terminal 10 which, in turn, is joined to the Priority A circuit described with reference to FIGURE 2. Terminal 10 is also connected to an input line of a Priority B circuit. This latter priority circuit is identical with that of Priority A with the exceptions that there are no inputs to Priority B from the SET output lines of the flip-flops corresponding to flip-flop 14 of the Priority B circuits of the other channels. Therefore, the operation of Priority B is not disabled by the operation of Priority B circuits in the other channels. Terminal 10 is connected to the SET input line of a flip-flop corresponding to flip-flop 14. Just as in FIGURE 2, the Priority B circuit is connected for CLEARING to a terminal to which the input from the memory timing is joined. This terminal is connected through inverter J–104 to CLEAR the flip-flop corresponding to flip-flop 14 of FIGURE 2. The outputs of Priority circuits A and B are joined to input terminals of an AND gate 38. The output of this AND gate is connected to an inverter W–100, the output of which is joined to the SET input line of a BUSY flip-flop comprising inverters K–010 and K–011 provided with cross-coupled feedbacks to form the flip-flop. The output of inverter W–100 is also connected by a channel enabling output line ot the Memory-Station 1 AND gate and to the input of the memory timing cycle circuitry (not shown). The CLEAR input line of the BUSY flip-flop is connected to the memory timing circuit such that on completion of the transmission on channel 1, the BUSY flip-flop is CLEARED. To terminal 10 there is also connected the SET input line of a Halt Scanner flip-flop. This flip-flop comprises a pair of inverters K–100 and K–101 having cross-coupled feedback paths. The CLEAR input line of the Halt Scanner flip-flop is also connected to the input from the memory timing which CLEARS the BUSY flip-flop on completion of transmission on channel 1. To an inverter J–101 there are connected the outputs on the SET output lines of the other Halt Scanner flip-flops, these being the outputs of the inverters K–201 through K–501 of the Halt Scanner flip-flops in the other four access channel selection circuits. The output of inverter J–101 is connected to the input of a second inverter J–102. To J–102 there is connected as an input the SET output line of the BUSY flip-flop, that being the output of inverter K–011. To the inverter J–102 there is also connected a pair of inputs from K–000 and K–003 of the Scanner which will be described in more detail hereinafter. The output of inverter J–102 is connected to the Priority B circuit as inputs to zener diodes corresponding to diodes 26 and 30 of the Priority A circuit shown in FIGURE 2. The CLEAR output line of the Halt Scanner flip-flop is connected to the Scanner as are the CLEAR output lines of the Halt Scanner flip-flops in the other four channels. The Scanner comprises an interconnected arrangement of three Scanner flip-flops. Scanner flip-flop 1 comprises a pair of cross-coupled inverters K–000 and K–001. The SET output line from Scanner flip-flop 1 is connected as one input to an AND gate 40. The other input of gate 40 is joined to the CLEAR output of the Halt Scanner flip-flop in channel 1, that being the output from inverter K–100. The output of AND gate 40 is connected to the SET input line of Scanner flip-flop 2 comprising cross-coupled inverters K–002 and K–003. The SET output line of Scanner flip-flop 2 is connected to the input terminal of AND gate 42 to which is also applied the CLEAR output from the Halt Scanner flip-flop in channel 2. The output of AND gate 42 is connected to the SET input line of Scanner flip-flop 3 comprising cross-coupled inverters K–004 and K–005. The SET output line of this Scanner flip-flop is connected to one input of AND gate 44 to which there is also connected the output on the CLEAR output line from the Halt Scanner flip-flop in channel 3. The output of AND gate 44 is connected to the CLEAR input line of Scanner flip-flop 1. The CLEAR output line of this flip-flop is connected to an AND gate 46 to which gate the output from the CLEAR output line of the Halt Scanner flip-flop in channel 4 is connnected. The output from AND gate 46 is applied as an input to the CLEAR input line of Scanner flip-flop 2. The CLEAR output line of Scanner flip-flop 2 is connected to an input terminal of an AND gate 48. The other input terminal of this AND gate is joined to the CLEAR output of the Halt Scanner flip-flop in channel 5. The output of AND gate 48 is connected to the CLEAR input line of Scanner flip-flop 3 and the CLEAR output line of this flip-flop is joined to the SET input line of Scanner flip-flop 1. For purposes to be hereinafter described, the SET output line of Scanner flip-flop 1 is also connected to the inverter in channel 4 corresponding with J–102 and the CLEAR output line of this flip-flop is joined to J–102 and the corresponding inverter in channel 3. The SET output line of Scanner flip-flop 2 is also joined to J–102 and the corresponding inverter in channel 5 and the CLEAR output line of this flip-flop is connected to the inverters corresponding to J–102 in channels 2 and 4. The SET output line of Scanner flip-flop 3 is connected to the inverter corresponding to J–102 in channel 2 and the CLEAR output line to corresponding inverters in channels 3 and 5. The Halt Scanner flip-flop SET output line is joined to the inverters in channels 2 through 5 corresponding to J–101. The SET output line of the BUSY flip-flop is connected to inverters J–102 and J–105 as well as the corresponding inverters in the other four channels.

The operation of the logical arrangement just described will be set forth for the conditions in which the storage module is NOT BUSY and then for the condition when it is BUSY. In the first case, it will be assumed that initially all of the flip-flops in the circuits, both within and external of the priority circuits are CLEARED. Under these conditions, the sequence of the free running Scanner may be explained. Since the Scanner flip-flop 3 is CLEARED, the output on its CLEAR output line SETS Scanner flip-flop 1. The Halt Scanner flip-flop in channel 1 being CLEAR, AND gate 40 is conditioned and Scanner flip-flop 2 is SET. Similarly, since AND gate 42 is conditioned by the "1" output from the Halt Scanner flip-flop of channel 2, AND gate 42 is conditioned to SET Scanner flip-flop 3. Since AND gate 44 is conditioned, the SET output line of Scanner flip-flop 3 then CLEARS Scanner flip-flop 1 which, in turn, through conditioned AND gate 46 CLEARS Scanner flip-flop 2. A cycle is completed since AND gate 48 is conditioned to allow Scanner flip-flop 3 to be CLEARED. Therefore, it is obvious that with no transmission on any channel, the Scanner is a free-running device. Continuing the description of the system when no information is transmitted on any of the channels, the Priority A circuit, by reason of the operation described with reference to FIGURE 2, inverts the logical "0" input at terminal 10 to place a logical "1" on one input terminal of AND gate 38. Since none of the Halt Scanner flip-flops in the other four channels is SET, four logical "0's" are applied as inputs to inverter J–101. This produces a logical "1" output therefrom which is applied to inverter J–102 to produce a "0" output which is applied to the Priority B circuit. This "0" input to Priority B is translated and inverted by the zener diodes corresponding to diodes 26 and 30 of FIGURE 2 to lock out the Priority B circuit preventing it from responding to information on the channel 1 request input line. Therefore, Priority B, regardless of the input thereto, produces a logical "1" output. AND gate 38 is thereby conditioned to apply a "1" to inverter W–100. The output of W–100 is a logical "0" which prevents the start of the memory timing cycle and the conditioning of the Memory-Station 1 AND gate. This "0" output also insures that the BUSY flip-flop remains CLEAR. When channel 1 requests that a communication path be established between Station 1 and the storage module, a logical "1" is applied to terminal 10. This input is inverted by Priority A to produce a "0" output which disables AND gate 38. Simultaneously, flip-flop 14 of the Priority A circuit is SET to disable the Priority A circuits of the other four channels thus insuring that the system operates on a "first come-first served" basis. The "0" output from AND gate 38 is inverted by W–100 to produce a logical "1" which simultaneously SETS the BUSY flip-flop, conditions the Memory-Station 1 AND gate, and starts the memory timing cycle. When the channel 1 request input is inverted by Priority A, the Halt Scanner flip-flop is also SET to stop the operation of the Scanner at channel 1. With the Scanner halted at channel 1, the outputs of inverters K–000 and K–003 are logical "0's." However, the output on the SET output line of the BUSY flip-flop is a logical "1" so that the output of inverter J–102 remains a logical "0" and the Priority B circuit remains locked out. However, SETTING of the BUSY flip-flop introduces a logical "1" to J–105 which inverts the signal to apply a "0" to zener diode 30 (FIG. 2) to CLEAR flip-flop 28. Simultaneously, the input "1" generated at the start of the memory timing cycle is applied to J–104 to introduce a logical "0" to Priority A which is translated and inverted by zener diode 36 to CLEAR flip-flop 14 thereby removing the disable signal from the Priority A circuits of the other four channels. On completion of the transmission between the interconnected station 1 and the storage module, the memory timing ararngement (not shown) provides CLEARING inputs to the BUSY flip-flop and the Halt Scanner flip-flop to return the channel 1 circuit to its initial condition and to cause resumption of the free-running scanning cycle.

Considering now the situation in which there is transmission on another channel before a request is received on channel 1, the Priority A circuit is disabled by the disabling input on one of the lines H–201 through H–501 from the Priority A circuit of the BUSY channel. In addition, Priority A is also disabled by a logical "1" input from the BUSY flip-flop of the BUSY channel to inverter J–105. The output of J–105 is a logical "0" which is translated and inverted by zener diodes 26 and 30 (FIG. 2) to produce respectively a logical "0" output from the Disable Inverter 24 and to CLEAR flip-flop 28. As a result, an inversion of "1" request input to Priority A of channel 1 is not permitted. Therefore, the output of Priority A remains a logical "1" which is applied to AND gate 38. Priority B circuit of channel 1 is also locked out since the Scanner is halted in some other position than channel 1 thereby producing a logical "1" on either K–000 or K–003 which produces a "0" output from inverter J–102 to lock out Priority B. Consequently, the Priority B circuit also fails to perform the inversion function on the input signal at terminal 10 so that AND gate 38 is conditioned to pass a "1" to inverter W–100 to thereby produce a "0" which prevents the Memory-Station 1 AND gate from being conditioned. However, the logical "1" input on the channel 1 request input line SETS the Halt Scanner flip-flop to terminate the conditioning of AND gate 40. Consequently, when transmission in the BUSY channel terminals and that channel is CLEARED to permit resumption of the scanning cycle, the Scanner will operate until it reaches channel 1 unless the operation of the Halt Scanner flip-flop in another waiting channel stops the scanner in its resumed cycle prior to its reaching channel 1. Assuming for convenience of description that this is not the case, the Scanner stops at channel 1 since AND gate 40 is not conditioned. Also assuming at this time that another channel is also waiting for transmission to terminate, there will be a logical "1" input to J–101 from the Halt Scanner flip-flop of the other waiting channel which produces a logical "0" output from J–101. In addition to this "0" being applied to the input of J–102, the outputs of inverters K–000 and K–003 in Scanner flip-flops 1 and 2 respectively are logical "0's" as is the output on the SET output line of the BUSY flip-flop of channel 1. This produce a logical "1" at the output of J–102 to unlock the Priority B circuit. The enabling of Priority B results in the inversion of the logical "1" request applied to the circuit to thereby terminate coincidence on AND gate 38 thereby producing a logical "1" output from inverter W–100 to close the circuit between station 1 and the storage module and to commence the CLEARING of the channel 1 circuitry in the manner heretofore described. Of course, flip-flop 14 of Priority A circuit of channel 1 has operated to disable the Priority A circuits of the other channels during the waiting period of channel 1 circuitry to prevent consecutive honoring of the same channel. Thus, with other channels besides channel 1 waiting for termination of transmission in another channel, the conflict is resolved by the operation of the Scanner. If, after termination of transmission on the original BUSY channel, the Scanner had resumed its cycle and stopped short of channel 1, the same operation would occur for the selected channel and channel 1 would have to wait its turn as dictated by the Scanner.

In the case where only channel 1 is awaiting termination of transmission on a BUSY channel, Priority B is not unlocked since either K–000 or K–003 has a logical "1" thereon which results in a "0" output from J–102. However, when the original transmission terminates, there is no other disable signal present on Priority A of channel 1. Therefore, Priority A is permitted to invert the request input thereby allowing the Memory-Station 1 AND gate to be enabled in the manner heretofore described.

It should here be noted that the outputs from the Scanner to the inverters corresponding to J–102 are arranged so that these inverters may produce logical "1" outputs to unlock the Priority B circuits only when there is another waiting channel and the Scanner is stopped at the channel associated with the particular inverter. This insures that each of the plurality of waiting channels is honored in turn.

Now that the logical operation of the high speed scanner and reservation system has been described, a preferred circuitry arranged in the logical configuration of FIGURE 2 will be set forth with reference to FIGURE 4. This circuitry comprises the Priority A circuit which constitutes a principal portion of the entire system of FIGURE 3. Utilizing individual elements and arrangements as employed in the Priority A circuit, the remainder of the system of FIGURE 3 may readily be assembled by one skilled in the art. The values of components illustrated have been selected for a system in which the logic levels external of the Priority A circuit are −1.1 volts for a logical "0" and −5.8 volts for a logical "1," and the internal logic levels of the Priority A circuit are +0.7 volt for a logical "0" and +1.7 volts for a logical "1." To the input terminal 10 is connected the Logic Level Translator 12 which comprises basically a NPN type transistor 12′ having a series arrangement of a pair of tunnel diodes 11 connected between its base and collector, the base of transistor 12′ being connected to terminal 10 through a diode system including zener diode 13. The collector of transistor 12′ is connected through a suitable coupling network to the base of a NPN type transistor H–100′ which constitutes one principal portion of a bistable multivibrator, or flip-flop, 14. Between the collector and base of transistor H–100′ is connected a pair of tunnel diodes 15. Transistor H–101′, of the NPN type, provided with tunnel diodes 17 between its collector and base constitutes the other principal portion of flip-flop 14. Transistors H–100′ and H–101′ are components of two inverter circuits provided with cross-coupled feedback from collector to base to constitute the flip-flop 14, a bistable device capable of storing information. The SET output line of flip-flop 14 is connected from the collector of H–101′ to the Priority A circuits of the other channels in the system to disable these channels when flip-flop 14 is SET in the manner heretofore described. An input line from inverter J–104 (not shown) is connected through a circuit including a zener diode 36 to the base of transistor H–101′ to serve as a CLEAR input line to flip-flop 14. The collector of transistor 12′ is also connected through a delay line 16 and a resistor 19 to the base of a NPN type transistor I–100′ which constitutes one principal portion of the bistable multivibrator, or flip-flop, 28. Between the collector and base of transistor I–100′ is connected a pair of tunnel diodes 21. Transisfor I–101′, of the NPN type provided with tunnel diodes 23 between its collector and base constitutes the other principal portion of flip-flop 28. The circuitry of flip-flops 14 and 28 is identical. An input line from inverter J–105 (not shown) is coupled through a circuit including a zener diode 26 to the base of a NPN type transistor 24′ which constitutes the principal portion of a Disable Inverter 24. Inputs from the SET output lines of flip-flops corresponding to flip-flop 14 of the instant circuit from the Priority A circuits of the remaining channels are individually connected through diodes 25 to the base of transistor 24′. These diodes are arranged and biased to constitute a positive OR circuit. Just as in the transistor arrangements previously described, a pair of tunnel diodes 27 is connected between the collector and base of transistor 24′. The collector of this transistor is also connected through a resistor 29 to the base of a transistor I–100′ of flip-flop 28. Resistors 19 and 29 are identical. Accordingly, the voltage level created at the base of transistor I–100′ due to the outputs of transistors 12′ and 24′ being coupled through resistors 19 and 29, respectively, cooperates with the action of tunnel diodes 21 to perform the ANDing function of gate 18 of the logic diagram. The AND function will hereinafter be described in greater detail. To the input line from inverter J–105 a coupling arrangement is provided to the base of inverter I–101′ of flip-flop 28 which includes a zener diode 30. The SET output line of flip-flop 28 is connected from the collector of I–101′ through a resistor 31 to the base of a transistor 32′ which constitutes the principal portion of Inverter 32. The collector of transistor 12′ is also connected through a delay line 20 and a resistor 33 to the base of transistor 32′, resistors 31 and 33 being identical. In the same manner as described previously, the voltage level at the junctions of resistors 31 and 33 combines with the operation of a pair of tunnel diodes 35 connected between the base and collector of transistor 32′ to perform the AND function corresponding to gate 22 illustrated in the logic diagram of FIGURE 2. The collector of transistor 32′ is connected through a coupling resistor to the input of a Logic Level Translator 34. This Logic Level Translator serves as a bi-level inverter and comprises basically a pair of PNP type transistors 34′ and 34″ provided with diode feedback paths. A similar circuit is fully described in the copending application of Leo F. Slattery entitled "Bi-Level Inverter Circuit," filed concurrently herewith. The output from the Priority A circuit is taken at the emitter of transistor 34″.

Except for the transistors utilized in the output Logic Level Translator 34, all of the transistors employed in the Priority A circuit are of high speed silicon NPN type having a gain-bandwidth of 1 kmc., which provides a time per inversion of approximately 2 to 4 nanoseconds depending on the loading. The tunnel diode network employed with each of the NPN transistors establishes an input threshold level and holds the output voltage at the sum of the tunnel diode drops and the base-emitter junction drop. The tunnel diodes are of the axial type having a peak current of 1 ma. and a forward voltage of 500 mv. Since each network includes two tunnel diodes in series, the diodes ideally switch at 1 ma. with a composite forward voltage of 1 volt. Although no two tunnel diodes switch at exactly the same point, the difference between diodes is negligible in this high speed circuit.

Logic level translator 12 performs the function of changing a −5.8 volt logical "1" to a +1.7 volt logical "1" and a −1.1 volt logical "0" to a +0.7 volt logical "0." On receipt of a −1.1 volt "0" input, the tunnel diodes will be back-biased and they will be in the low voltage state. Since the transistor 12′ is conducting due to the conventional biasing means, the collector potential is held at the base potential which is approximately +0.7 volt since the emitter of the transistor is grounded. However, on receipt of a −5.8 volt "1" input, a 6.2 volt drop across zener diode 13 causes the tunnel diode current to increase to approximately 1.2 ma. so that the diodes switch to their high voltage state. This causes the transistor conduction to decrease and the collector voltage becomes equal to the sum of the tunnel diode voltages and the base-emitter voltage, a total of +1.7 volts. The inverter circuits throughout the Priority A arrangement change a +1.7 volt "1" input to a +0.7 "0" output and vice-versa. Again, the output levels are taken from the collector and the collector potential is equal to the sum of the tunnel diode voltages plus the base to emitter voltage of the silicon transistor. The time required for a transition from one state to the other is approximately 4 nanoseconds.

The amount of speed-up capacitance used on inverters of this type is dependent upon the particular input thereto. However, the speed-up capacitance on the OR inputs to the Disable Inverter must be kept small since the flip-flop 14 of each Priority A circuit must drive four Disable Inverter inputs of the Priority A circuits of the other channels and will be loaded too heavily if too much speed-up capacitance is used. Also, the speed-up capacitance on AND inputs must be small to prevent runt pulses and partial enables from satisfying the AND.

To describe the several AND functions of the system in greater detail, reference is made to the arrangement employed in driving the base of transistor I–100′ which constitutes a principal portion of flip-flop 28. When logical "0's" are present at the collectors of transistors 12′ and 24′, or when one but not both of the collectors has a voltage level of +1.7 volts corresponding to a logical "1," the system is considered to be at its quiescent state during which tunnel diodes 21 are forward-biased and transistor I–100′ is conducting to produce a collector voltage thereon of +1.7 volts. However, when logical "1's" are present on the collectors of both transistors 12′ and 24′, the resistors 19 and 29 produce a voltage level at the base of transistor I–100′ back-biasing the tunnel diodes and allowing conduction of transistor I–100′ to increase thereby dropping its collector voltage to +0.7 volt corresponding to a logical "0." By the proper choice of circuit parameters, the tunnel diodes are back-biased only when both inputs via resistors 19 and 29 to the SET input line of flip-flop 28 are logical "1's." Therefore, an AND function is performed. The remaining AND arrangement of the Priority A circuit is accomplished by a similar circuit.

The output Logic Level Translator 34 converts a +0.7 volt logical "0" input to a −1.1 volt logical "0" output, and a +1.7 volt logical "1" input to a −5.8 volt logical "1" output.

As stated previously, the Priority B circuit is identical with that of Priority A with the exceptions that there are no inputs to the Priority B circuit from the SET output lines of the flip-flops corresponding to flip-flop 14 of the Priority B circuit of the other channels. Accordingly, in assembling a high speed scanner and reservation system as shown in FIGURE 3, a pair of circuits similar to that just described with reference to FIGURE 4 may be employed as Priority A and Priority B circuits. Circuitry similar to that of Inverter 32 may be utilized to fabricate inverters J–101, J–102, J–104, J–105 and W–100. Flip-flop arrangements such as those utilized in the Priority A circuit may also be employed to serve as a Halt Scanner flip-flop and a BUSY flip-flop as well as being interconnected to form a Scanner. The AND gates 38, 40, 42, 44, 46 and 48 may also be of the type utilized in the Priority A circuit in which a pair of identical resistors are connected from a previous stage to the base of a transistor having a pair of tunnel diodes joined between its collector and base. By appropriate interconnection of these elements in the manner set forth in FIGURE 3, the entire high speed scanner and reservation system may be assembled utilizing the circuitry described in detail with reference to FIGURE 4.

Employing the circuitry just described which operates on the logical principles set forth with reference to FIGURES 1 through 3, an improved high speed scanner and reservation system is provided which selectively permits one of a plurality of remote stations to communicate with a common storage module on a "first come-first served" basis over an associated access channel on which transmission requests arrive. In addition, when conflicts arise between access channels seeking to communicate with a busy storage module, the improved system effectively resolves the conflicts and dictates priority to the waiting access channels.

The over-all system set forth has been described as being a five channel communication arrangement. However, it will be understood that by appropriate circuitry design, similar systems may be arranged to handle greater or less complicated communication networks. It has also been assumed for purposes of illustration that an input request to the high speed scanner and reservation system is a single pulse input. However, it will also be understood that the request inputs from the various access channels may be coded in form with suitable decoding arrangements being employed, as well known in the prior art, to convert the coded requests into a form which may be utilized by the system of the invention.

In addition, it has also been assumed that communication is between a plurality of remote stations and a common storage module. It is obvious, however, that the common device need not be a storage element but may instead be any other type of central station such as employed in telephony, telegraphy, and related arts.

The above-described embodiment is illustrative of a preferred embodiment of the invention but is not intended to limit the possibilities of insuring a high speed scanner and reservation system which monitors communication between a storage module and a plurality of individual remote stations. The logical and electrical designs disclosed herein are examples of systems in which the inventive features of this disclosure may be utilized, and it will become apparent to one skilled in the art that certain modifications may be made within the spirit of the invention as defined by the appended claims.

What is claimed is:

1. A high speed scanner and reservation system for selectively honoring one of a plurality of access channels, each extending between a common storage module and independent remote stations, in response to transmission requests on said access channels, comprising: first and second electronic priority means connected to each of said access channels and means for normally locking said second priority means out of operation; said first priority means including logic circuitry responsive to a transmission request on any one of the said access channels, independently of a cyclic examination of said channels, to complete a transmission path on said one access channel between the storage module and the respective remote station while simultaneously inhibiting the first priority means of the remaining channels from being honored until transmission on the busy access channel is terminated; said second priority means including additional logic circuitry an the high speed scanner which cyclically examines said channels, the output from said scanner being connected to said locking means to unlock the additional logic circuitry of said second priority means in cyclic order only when transmission on a busy channel is completed and transmission requests from a plurality of other access channels are waiting to be honored.

2. A high speed scanner and reservation system as set forth in claim 1 wherein said first priority means comprises a plurality of interconnected priority circuits each connected to a separate access channel, each of said priority circuits being responsive to a transmission request on its associated channel to disable the remaining priority circuits from completing additional transmission paths.

3. A high speed scanner and reservation system as set forth in claim 1 wherein said first priority means includes a plurality of interconnected priority circuits each connected to a separate access channel, the logic circuitry of each of said priority circuits comprising a first bistable device, means for connecting said first bistable device to to the associated access channel; an AND gate having a pair of input terminals, one of said terminals being connected to said access channel; a disable inverter having a plurality of input lines, the output of said disable inverter being connected to the other of said AND gate input terminals; a second bistable device, means for connecting the output of said AND gate to said second bistable device; means for joining the output of the first bistable devices of each other priority circuits to the input lines of said disable inverter, and means responsive to the output of said second bistable device for completing a transmission path on the associated access channel.

4. A high speed scanner and reservation system as set forth in claim 3 wherein each of said bistable devices comprises a flip-flop having SET and CLEAR input lines and a SET output line, the SET input line of said first bistable device being connected to the associated access channel and the SET output line of said device being connected to the disable inverters of the other priority circuits; the SET input line of the second bistable device being connected to the output of the AND gate and the output of the second bistable device being on the SET output line; and means for CLEARING the bistable devices of a priority circuit when its associated access channel is honored.

5. A high speed scanner and reservation system as set forth in claim 1 wherein said scanner is normally free-running to scan each access channel in cyclic order, means responsive to transmission requests for halting said scanner at a busy channel and means for starting said scanner when transmission on said busy channel is terminated thereby allowing the scanner to resume scanning until it reaches the access channel next in cyclic order having a transmission request thereon.

References Cited by the Examiner

UNITED STATES PATENTS

| | | | |
|---|---|---|---|
| 3,117,303 | 1/1964 | Byrne | 340—147 |
| 3,199,081 | 8/1965 | Kok et al. | 340—147 |
| 3,241,124 | 3/1966 | Newhouse | 340—172.5 |

NEIL C. READ, *Primary Examiner.*

P. XIARHOS, D. YUSKO, *Assistant Examiners.*